(12) United States Patent
Tashiro et al.

(10) Patent No.: US 8,747,943 B2
(45) Date of Patent: Jun. 10, 2014

(54) METHOD FOR PRODUCING A MASTER MOLD AND CUTOUT PROCESSING METHOD FOR A MASTER MOLD

(71) Applicant: FUJIFILM Corporation, Tokyo (JP)

(72) Inventors: Kohtaro Tashiro, Minamiashigara (JP); Katsuhiro Nishimaki, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/799,784

(22) Filed: Mar. 13, 2013

(65) Prior Publication Data

US 2013/0193107 A1 Aug. 1, 2013

Related U.S. Application Data

(63) Continuation of application No. PCT/JP2011/004904, filed on Sep. 1, 2011.

(30) Foreign Application Priority Data

Sep. 13, 2010 (JP) .................................. 2010-203961

(51) Int. Cl.
  *B05D 5/12* (2006.01)
  *H01L 21/302* (2006.01)
  *H01L 21/461* (2006.01)
(52) U.S. Cl.
  USPC ............ 427/127; 427/156; 438/745; 438/754
(58) Field of Classification Search
  None
  See application file for complete search history.

(56) References Cited

U.S. PATENT DOCUMENTS

| 2005/0062135 A1 | 3/2005 | Tase et al. |
| 2006/0177569 A1* | 8/2006 | Fujiwara et al. ............. 427/127 |
| 2006/0177699 A1 | 8/2006 | Ichikawa et al. |
| 2006/0216550 A1* | 9/2006 | Kasahara ...................... 428/826 |
| 2008/0143020 A1* | 6/2008 | Ichikawa et al. ............. 264/293 |
| 2010/0215788 A1* | 8/2010 | Kido ................................ 425/3 |
| 2011/0007414 A1* | 1/2011 | Fukushima et al. ........... 360/39 |
| 2011/0064871 A1* | 3/2011 | Uchida et al. ................ 427/130 |

FOREIGN PATENT DOCUMENTS

| JP | 10-157149 A | 6/1998 |
| JP | 2003-72088 A | 3/2003 |
| JP | 4151077 B2 | 9/2008 |
| WO | 03/056613 A1 | 7/2003 |

OTHER PUBLICATIONS

Notification of Grounds for Rejection dated Sep. 3, 2013, issued in Japanese Patent Application No. 2010-203961.
International Search Report for PCT/JP2011/004904 dated Dec. 6, 2011.

* cited by examiner

*Primary Examiner* — Duy Deo
(74) *Attorney, Agent, or Firm* — Sughrue Mion, PLLC (57) ABSTRACT

A metal plate having a pattern of protrusions on a first surface thereof is produced; photoresist is provided on a second surface of the metal plate; the photoresist is removed from a portion of the metal plate corresponding to a loop shaped outer peripheral cutout region that contacts the outer periphery of a mold region of the metal plate; and the metal plate is etched using the remaining photoresist as a mask, in a method for producing and a method for cutting a processing a master mold having a pattern of protrusions and recesses corresponding to data to be transferred on a surface thereof.

20 Claims, 5 Drawing Sheets

METHOD FOR PRODUCING A MASTER MOLD AND CUTOUT PROCESSING METHOD FOR A MASTER MOLD

TECHNICAL FIELD

The present invention is related to a method for producing a master mold having a predetermined fine pattern of protrusions and recesses on the surface thereof. The present invention is also related to a cutout processing method for a master mold from a master plate.

BACKGROUND ART

Recently, magnetic transfer methods and nanoimprinting methods that efficiently transfer two dimensional and three dimensional patterns have been developed. Magnetic transfer is a transfer technique which is performed during the production of magnetic recording media. In magnetic transfer, a magnetic transfer master disk having a fine magnetic pattern on the surface thereof is placed in close contact with a slave medium (also referred to as a transfer target medium). A transfer magnetic field is applied in this state, and information corresponding to the magnetic pattern (servo signals, for example) is transferred onto the slave medium. Meanwhile, nanoimprinting is a transfer technique which is performed during the production of DTM (Discrete Track Media) and BPM (Bit Patterned Media). In nanoimprinting, a nanoimprinting master carrier having a fine pattern of protrusions and recesses is pressed against thermoplastic resin, photocuring resin, or the like, to transfer the pattern of protrusions and recesses onto the resin. According to these techniques, master molds (including the aforementioned master disk and the aforementioned master carrier) such as those described above can transfer two dimensional or three dimensional patterns at once by being pressed against slave media, enabling nano level fine patterns to be formed easily and at low cost.

An example of a master disk which is commonly utilized in the magnetic transfer method is that disclosed in Japanese Patent No. 4151077. This master disk has a pattern of protrusions and recesses corresponding to information to be transferred on the surface thereof, and a magnetic layer coated on the surface of the pattern of protrusions and recesses. Such a master disk is generally produced by: an electroforming step that laminates a metal plate constituted by an electroformed layer onto an original plate having information to be transferred as a pattern of protrusions and to recesses formed thereon; a separating step that separates the metal plate from the original plate; a cutting step that punches out the separated metal plate to a predetermined size and shape; and a coating step that coats a magnetic layer onto the surface of the pattern of protrusions and recesses.

However, in conventional master molds which are produced by the steps described above, there is a problem that local deformations that occur during punching in the aforementioned cutting step cause warping and distortions. If the flatness of the master mold is low due to the warping and distortions, a favorable close contact state cannot be realized between the master mold and slave media. As a result, a problem that highly precise pattern transfer cannot be performed due to defects in the close contact properties will arise.

For example, in the case that the flatness of a master disk is low, protrusions that cannot contact a slave medium appropriately will be present when the master disk is pressed against the slave medium, and a problem that the magnetic pattern cannot be correctly transferred will occur. Meanwhile, in the case that the flatness of a master carrier is low, a problem that the thickness of residual film which is formed at the bottoms of the recesses of a resist layer of a slave medium will become non uniform when the master carrier is pressed against the slave medium will arise. Accordingly, the flatness of master molds is extremely important in order to precisely perform pattern transfer in the aforementioned methods for performing transfer at once.

As means for solving this problem, cushioning materials are provided at the rear surface of master molds, close contact pressure is increased, and air within close contact surfaces between master molds and slave media are removed by vacuum suction, to improve the close contact properties of master molds with slave media.

DISCLOSURE OF THE INVENTION

However, these measures can improve close contact properties to a certain degree, but do not completely solve the problem of defective close contact properties. For example, if the close contact pressure is increased, there is a possibility that the pattern of protrusions and recesses of a master mold will be damaged or that unexpected deformations will occur. This may result in deterioration of the durability of the master mold and deterioration in the circularity of the arrangement of transferred signals. Accordingly, it is necessary to improve the flatness of the master mold by reducing warping and distortions that occur during cutout processing of the master mold, in order to solve this problem.

The present invention has been developed in view of the foregoing problem. It is an object of the present invention to provide a method for producing a master mold and a cutout processing method for a master mold that reduces warping and distortions during cutout processing of a master mold to enable cutout processing of a master mold having a high degree of flatness.

A method for producing a master mold of the present invention that achieves the above object is a method for producing a master mold having a pattern of protrusions and recesses corresponding to data to be transferred on a surface thereof, comprising:

producing a metal plate having the pattern of protrusions and recesses on a first surface thereof;

providing a protective layer on the first surface of the metal plate;

providing photoresist on a second surface of the metal plate;

removing the photoresist from a portion of the metal plate corresponding to a loop shaped outer peripheral cutout region that contacts the outer periphery of a mold region of the metal plate from the exterior;

etching the metal plate using the remaining photoresist as a mask;

removing the photoresist; and removing the protective layer.

In the present specification, that a region of the metal plate is "loop shaped" means that the region has a shape that surrounds the periphery of another predetermined region. In this case, the shape of the "loop shaped" region includes circles and rectangles.

The "mold region" refers to a region of the metal plate which is set to become the master mold by being cut out from the metal plate.

The "outer peripheral cutout region" refers to a region of the metal plate which is set to be etched in order to cut out the master mold from the metal plate.

The expression "removing the photoresist from a portion of the metal plate corresponding to a loop shaped outer peripheral cutout region" refers to removing the photoresist corresponding to the outer peripheral cutout region such that the width of the portion of the metal plate from which the photoresist has been removed corresponds to the width of the outer peripheral cutout region.

In the method for producing a master mold of the present invention, it is preferable for the photoresist to be removed from a portion of the metal plate corresponding to a stress dividing region which is remote from the outer peripheral cutout region and surrounds the outer peripheral cutout region from the exterior, in addition to removing the photoresist from the portion of the metal plate corresponding to the outer peripheral cutout region.

In the present specification, the "stress dividing region" refers to a region of the metal plate toward the exterior of the outer peripheral cutout region, which is set to be etched in order to divide stress.

It is preferable for the stress dividing region to be loop shaped; and for the width of the stress dividing region to be within a range from 0.5 mm to 10 mm. In this case, it is preferable for the outer peripheral cutout region to be of a circular shape; and for the stress dividing region to be of a circular shape which is concentric with the outer peripheral cutout region.

Further, it is preferable for the etching to be wet etching. In this case, it is preferable for the wet etching to employ an iron (III) chloride solution as an etching solution.

A configuration may be adopted, wherein: the photoresist is removed from the metal plate at a portion corresponding to an inner peripheral region that contacts the inner periphery of the mold region from the interior, in addition to removing the photoresist from the portion of the metal plate corresponding to the outer peripheral cutout region.

In the present specification, the "inner peripheral region" refers to a region of the metal plate which is set to be etched to form the shape of the inner periphery of the master mold.

A cutout processing method for a master mold of the present invention is a cutout processing method for a master mold having a pattern of protrusions and recesses corresponding to data to be transferred on a surface thereof, comprising:

producing a metal plate having the pattern of protrusions and recesses on a first surface thereof;

providing a protective film on the first surface of the metal plate; providing photoresist on a second surface of the metal plate;

removing the photoresist from a portion of the metal plate corresponding to a loop shaped outer peripheral cutout region that contacts the outer periphery of a mold region of the metal plate; and etching the metal plate using the remaining photoresist as a mask.

In the cutout processing method for a master mold of the present invention, it is preferable for the photoresist to be removed from a portion of the metal plate corresponding to a stress dividing region which is remote from the outer peripheral cutout region and surrounds the outer peripheral cutout region from the exterior, in addition to removing the photoresist from the portion of the metal plate corresponding to the outer peripheral cutout region.

It is preferable for the stress dividing region to be loop shaped; and for the width of the stress dividing region to be within a range from 0.5 mm to 10 mm. In this case, it is preferable for the outer peripheral cutout region to be of a circular shape; and for the stress dividing region to be of a circular shape which is concentric with the outer peripheral cutout region.

Further, it is preferable for the etching to be wet etching. In this case, it is preferable for the wet etching to employ an iron (III) chloride solution as an etching solution.

A configuration may be adopted, wherein: the photoresist is removed from the metal plate at a portion corresponding to an inner peripheral region that contacts the inner periphery of the mold region from the interior, in addition to removing the photoresist from the portion of the metal plate corresponding to the outer peripheral cutout region.

The method for producing a master mold and the cutout processing method for a master mold of the present invention produce a metal plate having the pattern of protrusions and recesses on a first surface thereof; provide a protective film on the first surface of the metal plate; provide photoresist on a second surface of the metal plate; remove the photoresist from a portion of the metal plate corresponding to a loop shaped outer peripheral cutout region that contacts the outer periphery of a mold region of the metal plate; and etch the metal plate using the remaining photoresist as a mask. Thereby, external forces which are applied to the master mold are reduced during a cutout process compared to the punching process, which had been conventionally employed. Therefore, deformations which are likely to occur during the cutout process can be suppressed. As a result, warpage and distortions can be reduced, and production or cutout processing of a master mold having a high degree of flatness is enabled.

BEST MODE FOR CARRYING OUT THE INVENTION

Hereinafter, embodiments of the present invention will be described with reference to the attached drawings. However, the present invention is not limited to the embodiments to be described below. Note that the dimensional ratios of the constituent elements of the drawings may differ from the actual dimensional ratios thereof, in order to facilitate visual understanding.

Figure 1A:
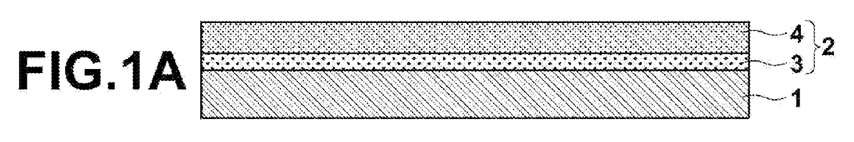
FIG. 1A is a schematic sectional diagram that illustrates a portion of the steps of a method for producing and a cutout processing method for a master disk to be employed in magnetic transfer according to a first embodiment of the present invention.
Figure 1B:
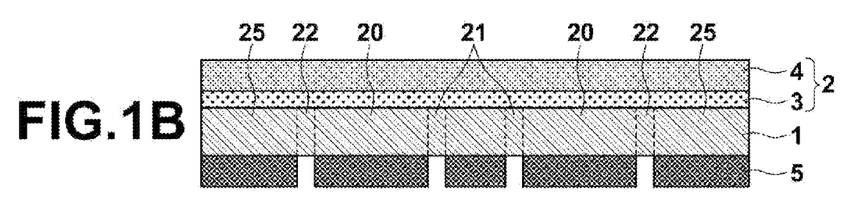
FIG. 1B is a schematic sectional diagram that illustrates a portion of the steps of the method for producing and a cutout processing method for a master disk to be employed in magnetic transfer according to the first embodiment.
Figure 1C:
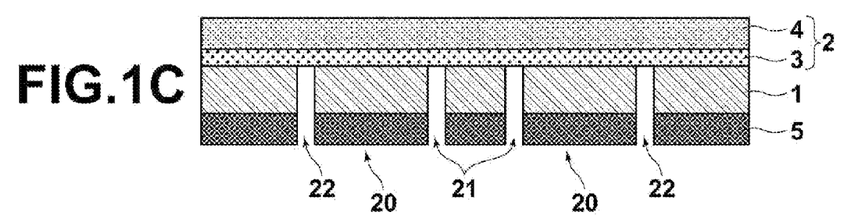
FIG. 1C is a schematic sectional diagram that illustrates a portion of the steps of the method for producing and a cutout processing method for a master disk to be employed in magnetic transfer according to the first embodiment.
Figure 1D:
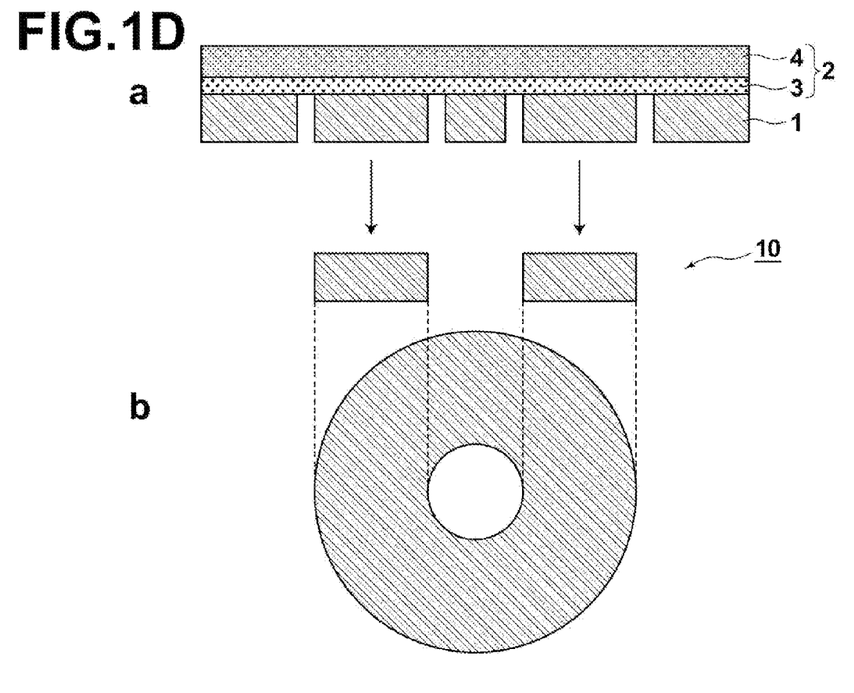
FIG. 1D is a schematic sectional diagram that illustrates a portion of the steps of the method for producing and a cutout processing method for a master disk to be employed in magnetic transfer according to the first embodiment.

First Embodiment of Method for Producing a Master Mold and Cutout Processing Method for a Master Mold FIG. 1A though FIG. 1D are schematic sectional diagrams that illustrate portions of the steps of a method for producing and a cutout processing method for a master mold (master disk) to be employed in magnetic transfer according to a first embodiment of the present invention. As illustrated in FIG. 1A through FIG. 1D, the cutout processing method of the master disk 10 according to the present embodiment produces and prepares a metal plate 1 having a pattern of protrusions and recesses on a first surface thereof, and provides a protective film 2 on the first surface of the metal plate 1 (FIG. 1A). Next, photoresist 5 is provided on a second surface of the metal plate 1, then portions of the photoresist 5 corresponding to an inner peripheral cutout region 21 and an outer peripheral cutout region 22 are exposed by an electron beam, and the exposed portions of the photoresist 5 are removed by a development process (FIG. 1B). Thereafter, wet etching is performed using the remaining photoresist 5 as a mask, to etch an inner peripheral cutout region 21 and an outer peripheral cutout region 22 of the metal plate 1 (FIG. 1C). The method for producing the master disk 10 of the present embodiment executes the cutout processing method described above, then removes all of the photoresist 5 (a of FIG. 1D), and separates the protective film 2 (b of FIG. 1D). Note that when actually producing the master disk 10 and administering the cutout process, the metal plate 1 is generally fixed to a handling member, taking the ease of handling operations into consideration. However, the handling member is omitted from FIG. 1A through FIG. 1D.

(Master Disk)

Figure 2:
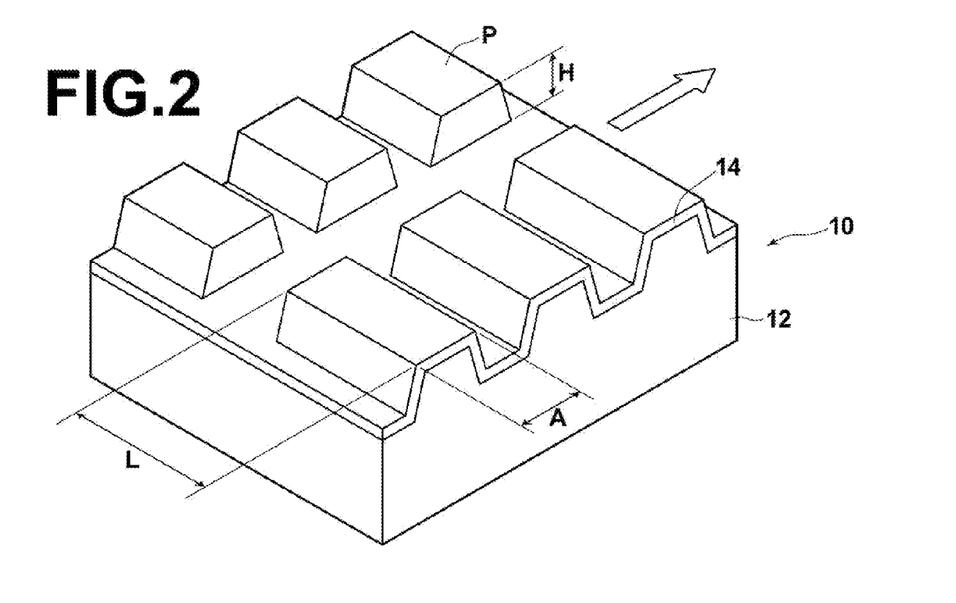
FIG. 2 is a partial enlarged perspective view of the master disk to be employed in magnetic transfer.

As illustrated in FIG. 2, the master disk 10 produced by the production method of the present embodiment is constituted by a metal master substrate 12 and a magnetic layer 14. The master substrate 12 has a pattern P of fine protrusions and recesses corresponding to information to be transferred on the surface thereof. The magnetic layer 14 is coated on the surface having the protrusions and recesses. Note that although not illustrated in FIG. 2, it is preferable for a protective layer and a lubricating layer to be provided on the magnetic layer 14.

The protrusions of the pattern P of fine protrusions and recesses are rectangular in plan view. The length A in the track direction (the circumferential direction of the disk, indicated by the white arrow in FIG. 2), the length L in the track width direction (the radial direction of the disk), and the height H (thickness) of each protrusion are set as appropriate according to recording density, recording signal waveforms, etc. For example, the length A may be set to be 80 nm, and the length L may be set to be 200 nm. In the case that the information to be transferred is servo signals of a magnetic disk to be employed as a hard disk device, the length L in the track width direction is set longer than the length A in the track direction A in the pattern P of fine protrusions and recesses. It is preferable for the length L in the track width direction to be within a range from 0.05 μm to 20 μm and for the length A in the track direction to be within a range from 0.05 μm to 5 μm, for example. Patterns with protrusions having greater lengths in the track width direction are preferable as patterns that bear information corresponding to servo signals. The height H of the protrusions (the depth of the recesses of the pattern) is preferably within a range from 20 nm to 800 nm, and more preferably within a range from 30 nm to 600 nm.

Figure 3:
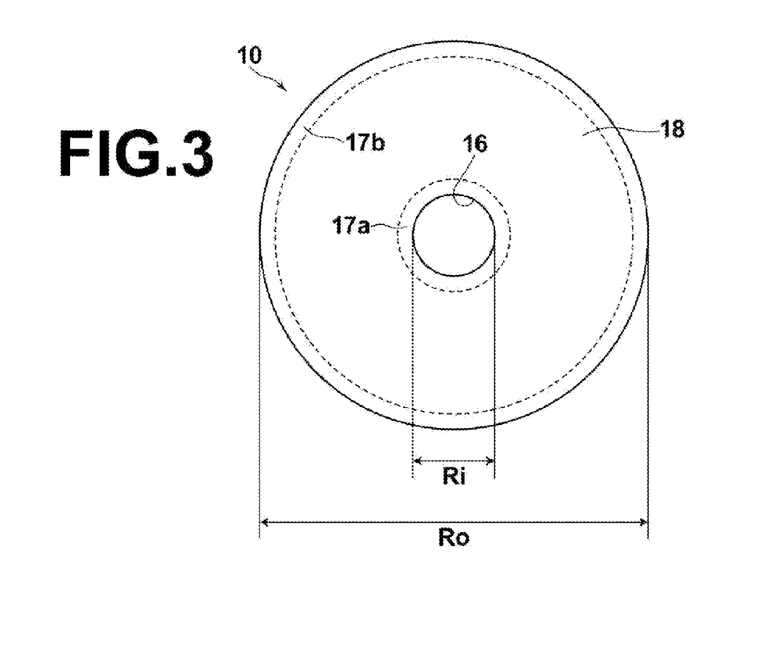
FIG. 3 is a plan view that illustrates the entire structure of the master disk to be employed in magnetic transfer.

In addition, the shape of the master disk 10 as a whole is a discoid disk with a central aperture 16, as illustrated in FIG. 3. The pattern P of protrusions and recesses illustrated in FIG. 2 is formed in an annular region 18 excluding an inner peripheral portion 17a and an outer peripheral portion 17b on one surface of the master disk 10.

Note that in the master disk 10, magnetic transfer is possible using only the master substrate 12 in the case that the master substrate 12 is formed by a ferromagnetic material having Ni or the like as a main component, and it is not necessary to provide the magnetic layer 14. However, it is preferable for the magnetic layer 14 having good transfer properties to be provided from the viewpoint of performing favorable magnetic transfer.

(Metal Plate)

The metal plate 1 has a pattern of protrusions and recesses corresponding to information to be magnetically transferred on the first surface thereof, and is an original plate, from which the master disk is produced by cutting out a portion thereof having a predetermined size and shape that includes the pattern of protrusions and recesses. The metal plate 1 is produced by: forming an electroformed layer on a quartz substrate or a silicon wafer having a pattern of protrusions and recesses on the surface thereof by electroforming; and separating the electroformed layer. Note that in the case that the magnetic layer is to be provided, the magnetic layer may be formed prior to the cutout processing step administered onto the metal plate 1, or may be formed following the cutout processing step. That is, in the case that the magnetic layer is formed prior to the cutout processing step, a cut out portion becomes the master disk as is, because a desired region is cut out from the metal plate 1 having the magnetic layer thereon. In contrast, in the case that the magnetic layer is formed following the cutout processing step, the master disk is obtained by forming the magnetic layer on the patterned surface of the cut out portion (the master substrate) of the metal plate 1. Further, a Ni electroformed layer may be employed as the metal plate 1, for example. The two dimensional shape of the metal plate 1 is not particularly limited, and may be a circle, a rectangle, etc.

(Protective Film)

The protective film 2 protects the pattern of protrusions and recesses formed on the surface of the metal plate 1 from damage and adherence of foreign matter during the steps of producing the master disk 10 from the metal plate 1 or during the cutout processing step. As illustrated in FIG. 1A through FIG. 1D, the protective film 2 may be constituted by an adhesive layer 3 that adheres to the metal plate 1, and a support layer 4 that imparts a desired strength or thickness to the protective film. It is preferable for the material of the protective film 2 or the adhesive layer 3 to be selected from among resins, etc. as appropriate.

(Formation, Exposure, and Development of Photoresist Film)

The method by which the photoresist film is formed is not particularly limited. The photoresist may be coated by the spin coat method, or by a method in which a resist sheet is adhesively attached. The photoresist is exposed at portions corresponding to the set inner peripheral cutout region 21 and the set outer peripheral cutout region 22. The other details of the film formation method, the exposure method, and the development method of the photoresist are not particularly limited, and techniques which are generally employed may be utilized.

(Inner Peripheral Cutout Region and Outer Peripheral Cutout Region)

Figure 4:
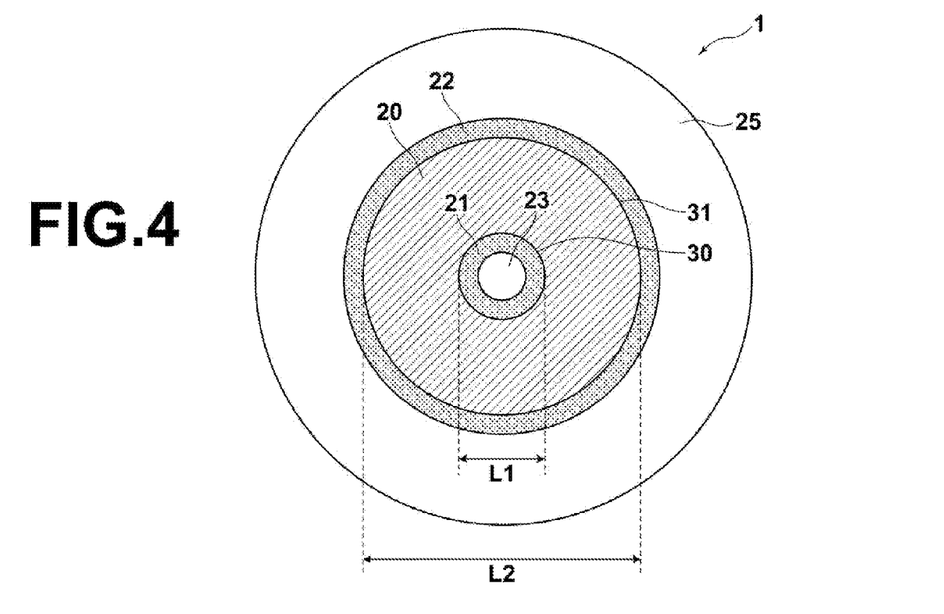
FIG. 4 is a conceptual diagram that illustrates the positional relationships and the shapes of a disk region (mold region), an inner peripheral cutout region, and an outer peripheral cutout region of a metal plate of the first embodiment.

FIG. 4 is a conceptual diagram that illustrates the positional relationships and the shapes of a disk region 20 (mold region 20), the inner peripheral cutout region 21, and the outer peripheral cutout region 22 of the metal plate 1 of the present embodiment. The disk region 20 refers to a region (mold region) of the metal plate 1 which is set to ultimately become the master disk 10. The inner peripheral cutout region 21 and the outer peripheral cutout region 22 are regions of the metal disk 1 which are set to be etched to cut out the master disk 10 from the metal plate 1, as illustrated in FIG. 4. Alternatively, the inner peripheral cutout region 21 and the outer peripheral cutout region 22 are regions that extend over a predetermined width within a region 23 and a region 25 along the borders of the regions 23 and 25 with the disk region 20. In greater detail, in the case that the master disk is of a circular shape as illustrated in FIG. 3, the inner peripheral cutout region 21 of FIG. 1B and FIG. 4 is an annular region that contacts an inner peripheral circle 30 that defines the circular shape of the disk region 20 (master disk) from the interior, which has a predetermined width toward the interior of the inner peripheral circle 30. Meanwhile, the outer peripheral cutout region 22 of FIG. 1B and FIG. 4 is an annular region that contacts an outer peripheral circle 31 that defines the circular shape of the disk region 20 (master disk) from the exterior, which has a predetermined width toward the exterior of the outer peripheral circle 31. In this case, the outer diameter L1 of the inner peripheral cutout region 21 is the same as the inner diameter Ri (FIG. 3) of the disk region 20, and the inner diameter L2 of the outer peripheral cutout region 22 is the same as the outer diameter Ro (FIG. 3) of the disk region 20. In addition, the circular shapes of the disk region 20, the inner peripheral cutout region 21, and the outer peripheral cutout region 22 are concentric.

The master disk 10 is cut out from the metal plate 1, by removing the photoresist from the metal plate 1 at portions that correspond to the inner peripheral region 21 and the outer peripheral region 22 (FIG. 1B), and by etching the inner peripheral region 21 and the outer peripheral region 22 of the metal plate 1 (FIG. 1C). The positions, the shapes, and the widths (the widths of the ring portions of the ringed shapes) of the cut out regions are set as appropriately according to the size and the shape of the master disk to be produced as well as etching conditions. For example, in the case that a master disk for performing magnetic transfer to 2.5 inch magnetic recording media is to be produced, the outer diameter L1 of the inner peripheral cutout region 21 is set to approximately 24 mm, and the inner diameter L2 of the outer peripheral cutout region 22 is set to approximately 65 mm. In addition, it is preferable for the widths of the cutout regions to be within a range from 0.5 mm to 10 mm. The lower limit of the width value is determined from the viewpoint of suppressing the generation of portions at which the resist is not removed (bridges) due to instabilities in the exposure/development processes (margin insufficiencies). The upper limit of the width value is determined from the viewpoint of preventing peeling of the protective film due to insufficient mechanical strength, which may occur in cases that the exposed area of the adhesive surface of the protective film is great following etching.

External forces which are applied to the master disk 10 can be reduced by cutting out the master disk 10 from the metal plate 1 by etching, and thereby, deformations which had been likely to occur during production or processing can be suppressed.

(Etching)

The etching may be dry etching or wet etching. However, wet etching is preferable from the viewpoint of reducing processing time. Further, the etching process easily proceeds isotropically in the case that wet etching is utilized, and therefore it is preferable for the etching to be a wet etching of a spray type in which directionality is imparted to etching liquid. Etching conditions are set as appropriate, based on the material of the metal plate 1, which is the target of etching. For example, in the case that the metal plate 1 is a Ni electroformed plate, it is preferable for an iron (III) chloride solution to be employed as an etching solution.

As described above, the method for producing a master mold and the method for cutout processing a master mold of the present embodiment produce a metal plate having the pattern of protrusions and recesses on a first surface thereof; provide a protective film on the first surface of the metal plate; provide photoresist on a second surface of the metal plate; remove the photoresist from a portion of the metal plate corresponding to a loop shaped outer peripheral cutout region that contacts the outer periphery of a mold region of the metal plate; and etch the metal plate using the remaining photoresist as a mask. Thereby, external forces which are applied to the master mold are reduced during a cutout process compared to the punching process, which had been conventionally employed. Therefore, deformations which are likely to occur during the cutout process can be suppressed. As a result, warpage and distortions can be reduced, and production or cutout processing of a master mold having a high degree of flatness is enabled.

Second Embodiment of Method for Producing a Master Mold and Cutout Processing Method for a Master Mold A method for producing a master mold and a cutout processing method for a master mold according to a second embodiment of the present invention will be described. The present embodiment is basically the same as the first embodiment, but differs from the first embodiment in that a stress dividing region is set toward the exterior of the outer peripheral cutout region 22. Accordingly, detailed descriptions of constituent elements which are the same as those of the first embodiment will be omitted, insofar as they are not particularly necessary.

Figure 5A:
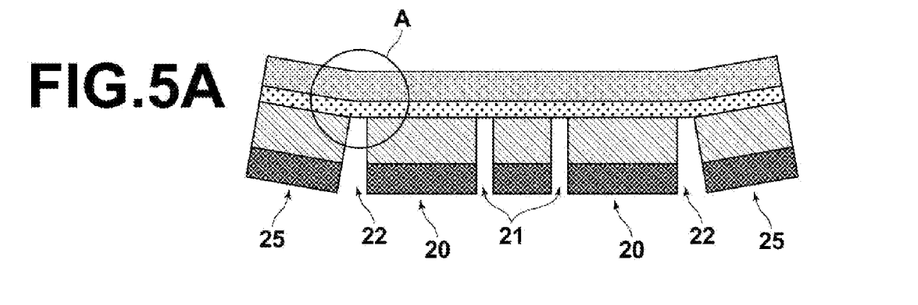
FIG. 5A is a schematic sectional diagram that illustrates a metal plate having a warped outermost region.

The first embodiment was described as a case in which cutout processing, in which only the inner peripheral cutout region 21 and the outer peripheral cutout region 22 were set, was administered to obtain the master disk 10. However, in the method of the first embodiment, there are cases in which the outermost region 25 of the metal plate 1 will warp upward, as illustrated in FIG. 5A. This phenomenon occurs conspicuously in the case that the metal plate 1 is formed by electroforming. This is because inner stress of the electroformed plate is divided by the cutout process, and equilibrium which had maintained flatness is destroyed, resulting in the divided portion deforming due to inner stress thereof.

Figure 5B:
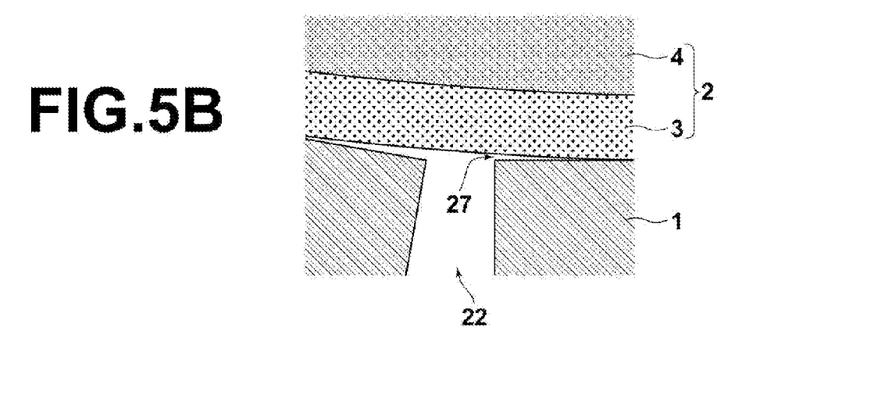
FIG. 5B is an enlarged sectional diagram of the warped portion A of FIG. 5A.

In the case that such a phenomenon occurs, the protective film 2 cannot track the deformation of the metal plate 1, as illustrated in FIG. 5B. As a result, a gap 27 will be generated between the protective film 2 and the patterned surface of the metal plate 1 in the vicinity of the outer peripheral cutout region 22, which is a problem. The presence of such a gap 27 may cause etchant, resist separating fluid, or cleansing solution to enter thereinto during the step of etching the metal plate, the resist removing step, or a cleansing step. Such fluids entering the gap will become a factor in contamination of the patterned surface of the metal plate 1, which is not preferable.

Means for avoiding such problems of the second embodiment will be described.

Figure 6A:
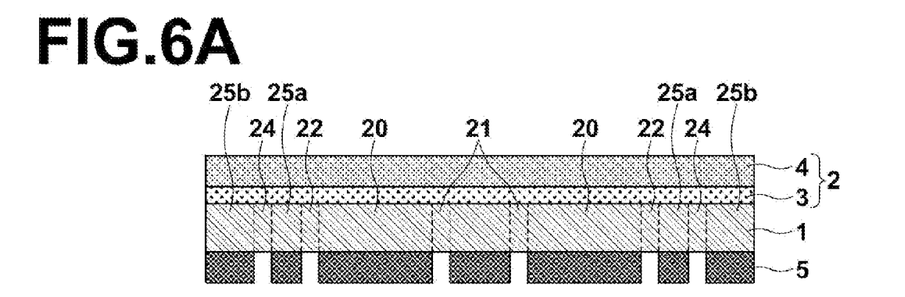
FIG. 6A is a schematic sectional diagram that illustrates a portion of the steps of a method for producing and a cutout processing method for a master disk to be employed in magnetic transfer according to a second embodiment of the present invention.
Figure 6B:
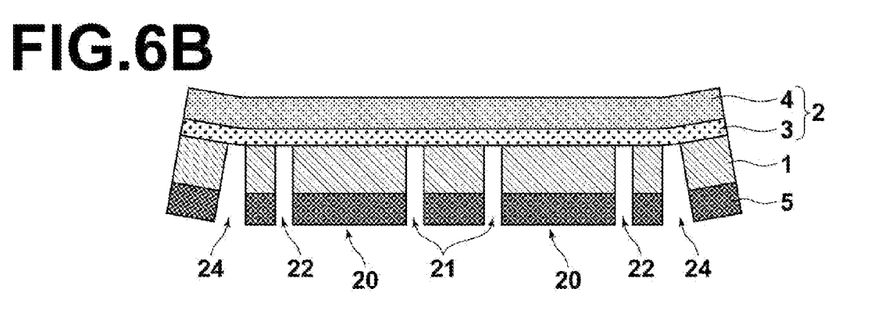
FIG. 6B is a schematic sectional diagram that illustrates a portion of the steps of the method for producing and a cutout processing method for a master disk to be employed in magnetic transfer according to the second embodiment.
Figure 6C:
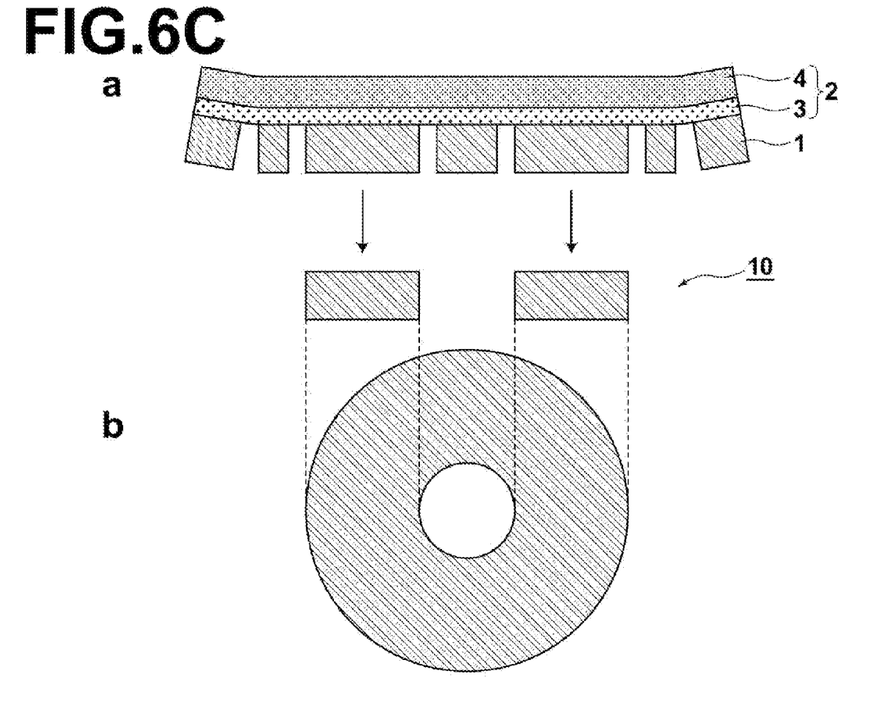
FIG. 6C is a schematic sectional diagram that illustrates a portion of the steps of the method for producing and a cutout processing method for a master disk to be employed in magnetic transfer according to the second embodiment.

FIG. 6A through FIG. 6C are schematic sectional diagrams that illustrate portions of the steps of a method for producing and a cutout processing method for a master disk to be employed in magnetic transfer according to the second embodiment of the present invention. The cutout processing method for the master disk 10 according to the present embodiment performs the same steps as those of the first embodiment up to and including the step of providing the photoresist 5 on the metal plate 1. Thereafter, portions of the photoresist 5 corresponding to the inner peripheral cutout region 21, the outer peripheral cutout region 22, and a stress dividing region 24 are exposed by an electron beam, and the exposed portions of the photoresist 5 are removed by a development process (FIG. 6A). Thereafter, wet etching is performed using the remaining photoresist 5 as a mask, to etch the inner peripheral cutout region 21, the outer peripheral cutout region 22, and the stress dividing region 24 of the metal plate 1 (FIG. 6B). The method for producing the master disk 10 of the present embodiment executes the cutout processing method described above, then removes the remaining photoresist 5 (a of FIG. 6C), and separates the protective film 2 (b of FIG. 6C).

(Stress Dividing Region)

Figure 7:
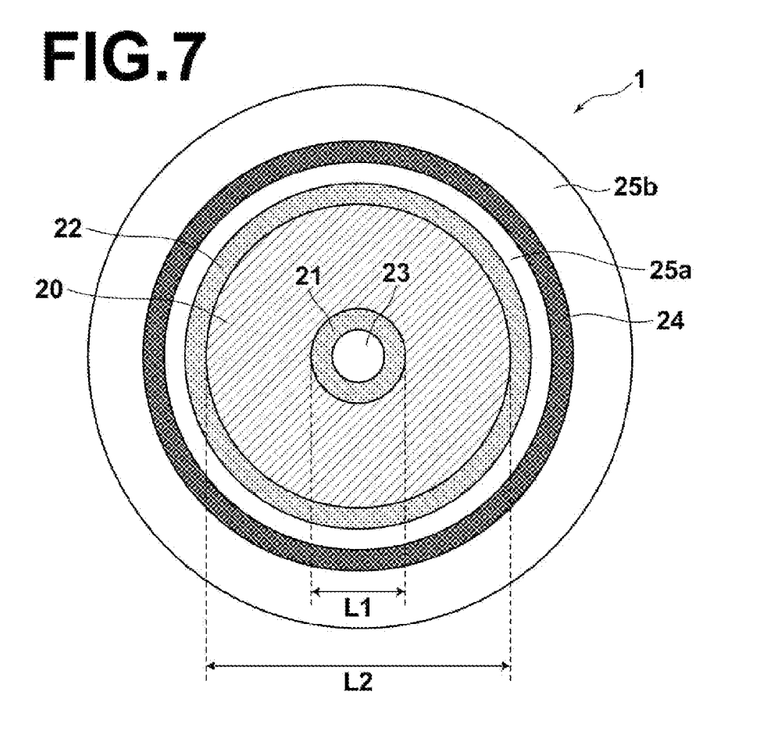
FIG. 7 is a conceptual diagram that illustrates the shapes and positional relationships among a disk region (mold region), an inner peripheral cutout region, an outer peripheral cutout region, and a stress dividing region of a metal plate of the second embodiment.

FIG. 7 is a conceptual diagram that illustrates the shapes and positional relationships among the disk region 20, the inner peripheral cutout region 21, the outer peripheral cutout region 22, and the stress dividing region 24 of the metal plate 1 of the second embodiment. As illustrated in FIG. 7, the stress dividing region 24 is a region of the metal plate 1 which is set to be etched such that the influence of the aforementioned upward warpage does not reach the disk region. As illustrated in FIG. 7, the stress dividing region 24 is an annular region of the metal plate 1 having a predetermined width at a predetermined distance toward the exterior of the loop shaped outer peripheral cutout region 22. In the case that such a stress dividing region 24 is set and this region of the metal plate 1 is etched, the influence of the warpage does not reach the disk region 20 even if a region 25b toward the exterior of the stress dividing region 24 warps upward as illustrated in FIG. 6B, because a region 25a is interposed between the outer peripheral cutout region 22 and the stress dividing region 24. Thereby, the problem that etchant and the like entering the gap 27 and contaminating the patterned surface of the metal plate 1 can be avoided.

The stress dividing region 24 is preferably set such that the distance between the stress dividing region 24 and the outer peripheral cutout region 22 (in the present embodiment, half the difference between the outer diameter of the outer peripheral cutout region 22 and the inner diameter of the stress dividing region 24) is within a range from 5 mm to 20 mm. In addition, it is preferable for the width of the stress dividing region 24 (the width of the annular ring portion) to be within a range from 0.5 mm to 10 mm. The lower limit value and the upper limit value of the width are set for the same reasons as those for the widths of the cutout regions. The shape of the stress dividing region 24 is not particularly limited, and the stress dividing region 24 may be rectangular as long as provision thereof can preclude influence of warpage onto the disk region 20. However, from the viewpoint of uniformly dividing stress, it is preferable for the shape of the stress dividing region 24 to be of a shape which is appropriately selected to correspond to the shapes of the disk region 20, the inner peripheral cutout region 21, and the outer peripheral cutout region 22. For example, in the case that a master disk for performing magnetic transfer to 2.5 inch magnetic recording media is to be produced, it is preferable for the inner peripheral cutout region 21, the outer peripheral cutout region 22, and the stress dividing region 24 to be concentric circular shapes, for the outer diameter L1 of the inner peripheral cutout region 21 to be set to approximately 24 mm, and for the inner diameter L2 of the outer peripheral cutout region 22 to be set to approximately 65 mm. In this case, it is preferable for the inner diameter of the stress dividing region 24 to be set to approximately 80 mm. In addition, the number of stress dividing regions 24 is not limited to one. A plurality of stress dividing regions 24 may be provided as necessary.

As described above, the method for producing a master mold and the method for cutout processing a master mold of the present embodiment also produce a metal plate having the pattern of protrusions and recesses on a first surface thereof; provide a protective film on the first surface of the metal plate; provide photoresist on a second surface of the metal plate; remove the photoresist from a portion of the metal plate corresponding to a loop shaped outer peripheral cutout region that contacts the outer periphery of a mold region of the metal plate; and etch the metal plate using the remaining photoresist as a mask. Therefore, the same advantageous effects as those obtained by the first embodiment are exhibited by the present embodiment of the invention.

Further, the method for producing a master mold and the method for cutout processing a master mold of the present embodiment provides a stress dividing region to prevent influence of warpage from reaching a disk region, and etches the metal plate at the stress dividing region. Thereby, the problem that etchant and the like entering gaps caused by warpage and contaminating the patterned surface of the metal plate can be avoided.

(Design Modifications)

The first and second embodiments were described as cases in which master disks for magnetic transfer were produced as master molds. However, the present invention is not limited to such cases, and may be applied to master carriers for nanoimprinting. Note that in the case that the present invention is applied to master disks, it is necessary for the shape of the disk to be annular, and therefore the central aperture 16 was provided at the center of the disk. However, in the case that the present invention is applied to master carriers for nanoimprinting, there are cases in which such central apertures need not be provided.

What is claimed is:

1. A method for producing a master mold having a pattern of protrusions and recesses corresponding to data to be transferred on a surface thereof, comprising:
   producing a metal plate having the pattern of protrusions and recesses on a first surface thereof;
   providing a protective layer on the first surface of the metal plate;
   providing photoresist on a second surface of the metal plate;
   removing the photoresist from a portion of the metal plate corresponding to a loop shaped outer peripheral cutout region that contacts the outer periphery of a mold region of the metal plate from the exterior;
   etching the metal plate using the remaining photoresist as a mask;
   removing the photoresist; and
   removing the protective layer.

2. A method for producing a master mold as defined in claim 1, wherein:
   the photoresist is removed from a portion of the metal plate corresponding to a stress dividing region which is remote from the outer peripheral cutout region and surrounds the outer peripheral cutout region from the exterior, in addition to removing the photoresist from the portion of the metal plate corresponding to the outer peripheral cutout region.

3. A method for producing a master mold as defined in claim 2, wherein:
   the stress dividing region is loop shaped; and
   the width of the stress dividing region is within a range from 0.5 mm to 10 mm.

4. A method for producing a master mold as defined in claim 3, wherein:
   the outer peripheral cutout region is of a circular shape; and
   the stress dividing region is of a circular shape which is concentric with the outer peripheral cutout region.

5. A method for producing a master mold as defined in claim 1, wherein:
   the etching is wet etching.

6. A method for producing a master mold as defined in claim 4, wherein:
   the etching is wet etching.

7. A method for producing a master mold as defined in claim 5, wherein:
   the wet etching employs an iron (III) chloride solution as an etching solution.

8. A method for producing a master mold as defined in claim 6, wherein:
   the wet etching employs an iron (III) chloride solution as an etching solution.

9. A method for producing a master mold as defined in claim 1, wherein:
   the photoresist is removed from the metal plate at a portion corresponding to an inner peripheral region that contacts the inner periphery of the mold region from the interior, in addition to removing the photoresist from the portion of the metal plate corresponding to the outer peripheral cutout region.

10. A method for producing a master mold as defined in claim 8, wherein:
    the photoresist is removed from the metal plate at a portion corresponding to an inner peripheral region that contacts the inner periphery of the mold region from the interior, in addition to removing the photoresist from the portion of the metal plate corresponding to the outer peripheral cutout region.

11. A cutout processing method for a master mold having a pattern of protrusions and recesses corresponding to data to be transferred on a surface thereof, comprising:
    producing a metal plate having the pattern of protrusions and recesses on a first surface thereof;
    providing a protective film on the first surface of the metal plate;
    providing photoresist on a second surface of the metal plate;
    removing the photoresist from a portion of the metal plate corresponding to a loop shaped outer peripheral cutout region that contacts the outer periphery of a mold region of the metal plate; and
    etching the metal plate using the remaining photoresist as a mask.

12. A cutout processing method for a master mold as defined in claim 11, wherein:
    the photoresist is removed from a portion of the metal plate corresponding to a stress dividing region which is remote from the outer peripheral cutout region and surrounds the outer peripheral cutout region from the exterior, in addition to removing the photoresist from the portion of the metal plate corresponding to the outer peripheral cutout region.

13. A cutout processing method for a master mold as defined in claim 12, wherein:
    the stress dividing region is loop shaped; and
    the width of the stress dividing region is within a range from 0.5 mm to 10 mm.

14. A cutout processing method for a master mold as defined in claim 13, wherein:
    the outer peripheral cutout region is loop shaped; and
    the stress dividing region is loop shaped which is concentric with the outer peripheral cutout region.

15. A cutout processing method for a master mold as defined in claim 11, wherein:
    the etching is wet etching.

16. A cutout processing method for a master mold as defined in claim 14, wherein:
    the etching is wet etching.

17. A cutout processing method for a master mold as defined in claim 15, wherein:
    the wet etching employs an iron (III) chloride solution as an etching solution.

18. A cutout processing method for a master mold as defined in claim 16, wherein:
    the wet etching employs an iron (III) chloride solution as an etching solution.

19. A cutout processing method for a master mold as defined in claim 11, wherein:
    the photoresist is removed from the metal plate at a portion corresponding to an inner peripheral region that contacts the inner periphery of the mold region from the interior, in addition to removing the photoresist from the portion of the metal plate corresponding to the outer peripheral cutout region.

20. A cutout processing method for a master mold as defined in claim 18, wherein:
    the photoresist is removed from the metal plate at a portion corresponding to an inner peripheral region that contacts the inner periphery of the mold region from the interior, in addition to removing the photoresist from the portion of the metal plate corresponding to the outer peripheral cutout region.

* * * * *